(12) United States Patent
Jiang et al.

(10) Patent No.: US 8,962,213 B2
(45) Date of Patent: Feb. 24, 2015

(54) DIRECT CATALYST COATING ON FREE STANDING MICROPOROUS LAYER

(75) Inventors: Ruichun Jiang, Rochester, NY (US); Matthew Dioguardi, Rochester, NY (US); Michael T. Flanagan, Hilton, NY (US); Craig S. Gittleman, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 13/071,603

(22) Filed: Mar. 25, 2011

(65) Prior Publication Data

US 2012/0244452 A1     Sep. 27, 2012

(51) Int. Cl.
*H01M 8/10* (2006.01)
*B29C 65/02* (2006.01)

(52) U.S. Cl.
CPC .......... *H01M 8/1004* (2013.01); *Y02E 60/521* (2013.01); *Y10S 977/948* (2013.01)
USPC .......... 429/483; 156/278; 156/228; 977/948

(58) Field of Classification Search
USPC .................. 429/483; 156/278, 228; 977/948
See application file for complete search history.

(56) References Cited

U.S. PATENT DOCUMENTS

| 5,865,968 | A  | * | 2/1999  | Denton et al. ................ 204/284 |
| 2007/0077475 | A1 |   | 4/2007  | Lai et al. |
| 2009/0246592 | A1 | * | 10/2009 | Kinoshita ........................ 429/33 |
| 2012/0122016 | A1 | * | 5/2012  | Jiang et al. ..................... 429/492 |

FOREIGN PATENT DOCUMENTS

JP       05021077 A  *  1/1993  ............. H01M 8/02

* cited by examiner

*Primary Examiner* — Karie O'Neill Apicella
(74) *Attorney, Agent, or Firm* — Dinsmore & Shohl LLP

(57) ABSTRACT

Methods of making reinforced membrane electrode assemblies are described. Catalyst coated free standing microporous layers and reinforced membrane electrode assemblies are also described.

10 Claims, 3 Drawing Sheets

DIRECT CATALYST COATING ON FREE STANDING MICROPOROUS LAYER

FIELD OF THE INVENTION

The present invention relates generally to fuel cells, and more particularly to free standing microporous layers (MPL) coated with catalyst layers, to polymer membranes made with such layers, and to a process of improving fuel cell durability.

BACKGROUND OF THE INVENTION

Electrochemical conversion cells, commonly referred to as fuel cells, produce electrical energy by processing reactants, for example, through the oxidation and reduction of hydrogen and oxygen. As a central component of a polymer electrolyte fuel cell (PEFC), the membrane electrode assembly (MEA) comprises a polymer membrane (e.g., a proton exchange membrane (PEM)) with catalyst layers on both sides. The MEAs are typically divided into catalyst coated membrane (CCM), and catalyst coated diffusion media (CCDM) attached to the PEM.

Durability is one factor that affects the commercial viability of a fuel cell. Mechanical failure of the MEA due to membrane swelling and buckling is a major problem affecting fuel cell durability. To improve MEA durability, MPL layers have been hot-pressed onto the CCM and positioned between the CCM and a pair of gas diffusion media layers. The components are compressed to form the fuel cell. There are several drawbacks to this method. The MEA fabrication process is more complicated, and thus increases the manufacturing cost. In addition, this technique does not fit the current fuel cell stack designs on MEA sub-gasket edge protection. Furthermore, it involves multiple hot-press procedures, which may damage the PEM and MEA. There is thus a need for processing to improve fuel cell durability at a minimal cost, without potential damage to the components, and without interfering with the current fuel cell stack designs.

SUMMARY OF THE INVENTION

This need is met with the present invention. One aspect of the invention involves a method of making a reinforced membrane electrode assembly. In one embodiment, the method includes providing a catalyst coated free standing microporous layer; providing a polymer membrane; and bonding the catalyst coated free standing microporous layer on a surface of the polymer membrane.

Another aspect of the invention involves a catalyst coated free standing microporous layer. In one embodiment, the catalyst coated free standing microporous layer includes a free standing microporous layer; and a catalyst layer coated on a surface of the free standing microporous layer.

Another aspect of the invention relates to a reinforced membrane electrode assembly. In one embodiment, the reinforced membrane electrode assembly includes a polymer membrane; and a catalyst coated free standing microporous layer bonded to a surface of the polymer membrane.

DESCRIPTION OF THE INVENTION

Figure 1:
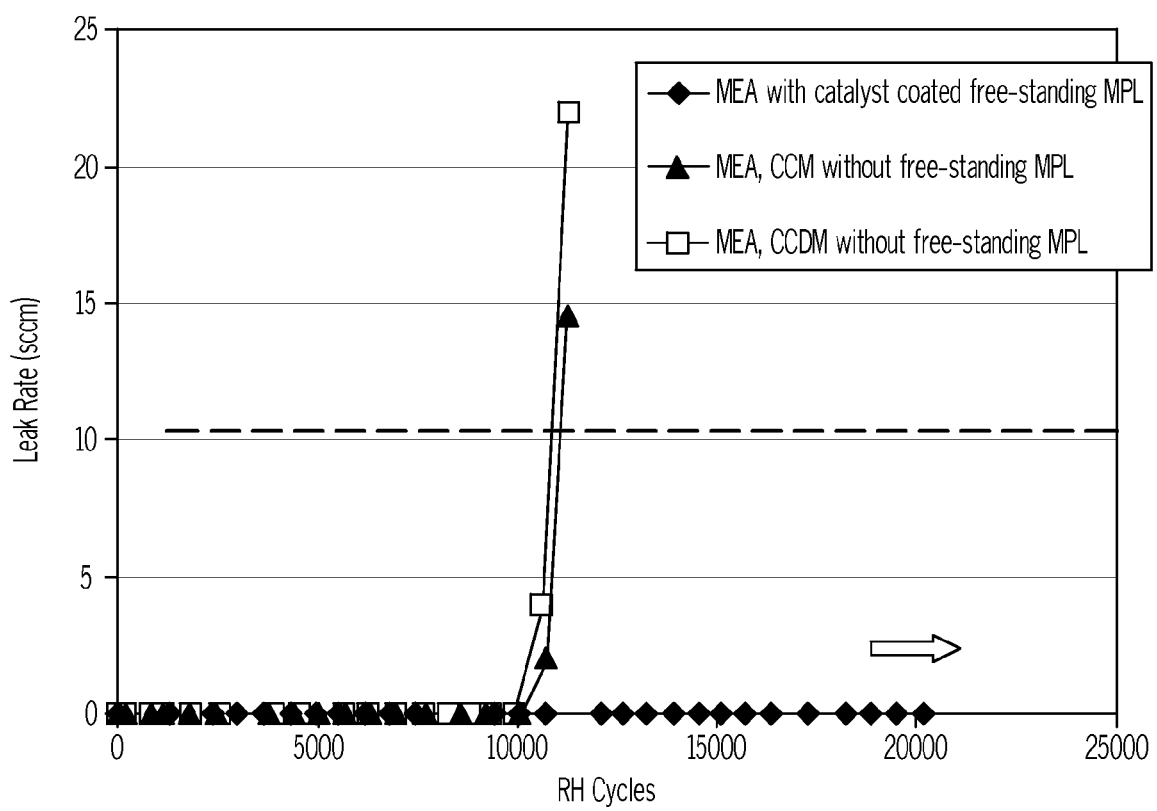
FIG. 1 is a graph showing fuel cell leak rate as a function of test cycles during RH cycling tests.

One or more layers of catalyst are coated onto free standing microporous layers (MPL). The catalyst coated MPLs can then be bonded to a PEM and used in a fuel cell as external reinforced layers. A MEA with external reinforced layers made in this way demonstrates reduced membrane buckling and improved fuel cell durability.

Free standing MPL material is coated with one or more layers of catalyst. Free standing MPL material is commercially available from W. L. Gore & Associate (Gore), of Maryland, under the designation Carbel® MP30Z. The MPL material normally contains electrically conductive materials (e.g., carbon powders) and other support material (e.g., hydrophobic fluoropolymers). Unlike the MPL on the regular gas diffusion media, the free standing MPL holds together without any extra substrate needed.

The coating material typically contains catalyst, and a proton conductive ionomer in a solvent. Suitable solvents include, but are not limited to, one or more of water, alcohol, and other organic additives. To achieve a smooth catalyst coating surface and control mud-cracking, additives, such as carbon nanofiber, can be added to the coating material.

The catalyst can be coated on the free standing MPL in a shim frame with a specified thickness. The use of the shim frame makes it easier to obtain uniform catalyst loadings and is controlled by the thickness of the shim. A vacuum can be used to help hold the free standing MPL in place, if desired. The shim frame can be made of a material which is dimensionally stable and which does not interact with any of the components of the electrode ink. Good-quality shim materials with uniform thickness are commercially available. Suitable materials include, but are not limited to, polyimide film (e.g., DuPont Kapton®), polyethylene naphthalate film (PEN) (e.g., DuPont Teonex®), ethylene tetrafluoroethylene (ETFE), stainless steel, and the like.

In one of the coating processes using a shim frame coating technique, a frame with a certain thickness of shim film is placed on top of the free standing MPL. The free standing MPL is placed on the flat surface of a plate with porous structure (e.g., graphite plate). Vacuum is applied at the bottom of the graphite plate to suck and hold the free standing MPL in place. The coating material is initially placed on the shim film without contacting the free standing MPL, and then sliding a brush/slide bar through the coating material to cover the whole area of the free standing MPL. The thickness of each pass of coating is determined by the thickness of the shim film and the amount of solid materials (e.g., catalyst, ionomer) inside of the ink of coating material. The catalyst coated free standing MPL is then dried at a temperature typically between 300 to 500° F. for 15 to 20 minutes. This coating process can be repeated as needed to obtain the catalyst thickness required. By working through this procedure, the coated catalyst layers on the MPL have a smooth surface and no visible mud-cracking, and the catalyst coated free standing MPL has no visible wrinkle or damage.

The catalyst coated MPLs are bonded on one or both sides of the PEM by placing the catalyst coated MPL with the PEM under a pressure of about 150-200 psi compression pressure and a temperature of about 280-320° F. The resulting MEA has one or two reinforcement MPL layers to provide extra support for the PEM, which reduces the buckling of the PEM, leading to improved fuel cell durability.

The MEA can optionally include a subgasket positioned between the PEM and the catalyst coated MPL on one or both sides. The subgasket has the shape of a frame, and the size of the window is smaller than the size of the catalyst coated MPL and the size of the PEM.

The resulting MEA can then be placed between a pair of diffusion media together with other parts which may include gas flow field plates, current collector and end plates, to form a single fuel cell.

COMPARATIVE EXAMPLE 1

A regular CCM MEA was made according to a decal transfer method. A catalyst solution containing Pt/Vulcan catalyst with a loading of 0.4 mg Pt/cm$^2$ was coated on ETFE decals. After drying, the catalyst layers were transferred from the ETFE decals onto both sides of a PEM by a hot press method at a temperature of 295° F., and 200 psi compression pressure to form a CCM.

The CCM was then placed between a pair of diffusion media together with other parts including gas flow field plates, current collector and end plates, to form a fuel cell.

EXAMPLE 1

A CCM was made according to one embodiment of the present process. A catalyst solution containing Pt/Vulcan catalyst, with a loading of 0.4 mg Pt/cm$^2$ was coated onto a free standing MPL (Carbel® MP30Z from Gore).

Two catalyst coated MPLs were then bonded to a PEM by a hot press method at a temperature of 295° F., and 200 psi compression pressure to form a reinforced MEA.

The CCM was then placed between a pair of diffusion media and other parts including gas diffusion media gas flow field plates, current collector and end plates, to form a single fuel cell.

The fuel cells of Comparative Example 1 and Example 1 were tested for fuel cell durability by relative humidity (RH) cycling. The testing conditions were: RH Cycle at 0.1 A/cm$^2$—constant current; Cell Build: 50 cm$^2$ cell with 2 mm lands and 2 mm straight channels flow field; Cycle: 2 min 150% RH H$_2$/air; 2 min 0% RH H$_2$/air flow; Conditions: 80° C., 0 kPa gauge pressure, 20 SLPM anode and cathode stoichiometries, counter-flow; Diagnostics: Physical crossover leak (failure=10 sccm), H$_2$ crossover current (mA/cm$^2$), fluoride ion release rate from membrane degradation (FRR) (g/cm$^2$·h).

Figure 3:
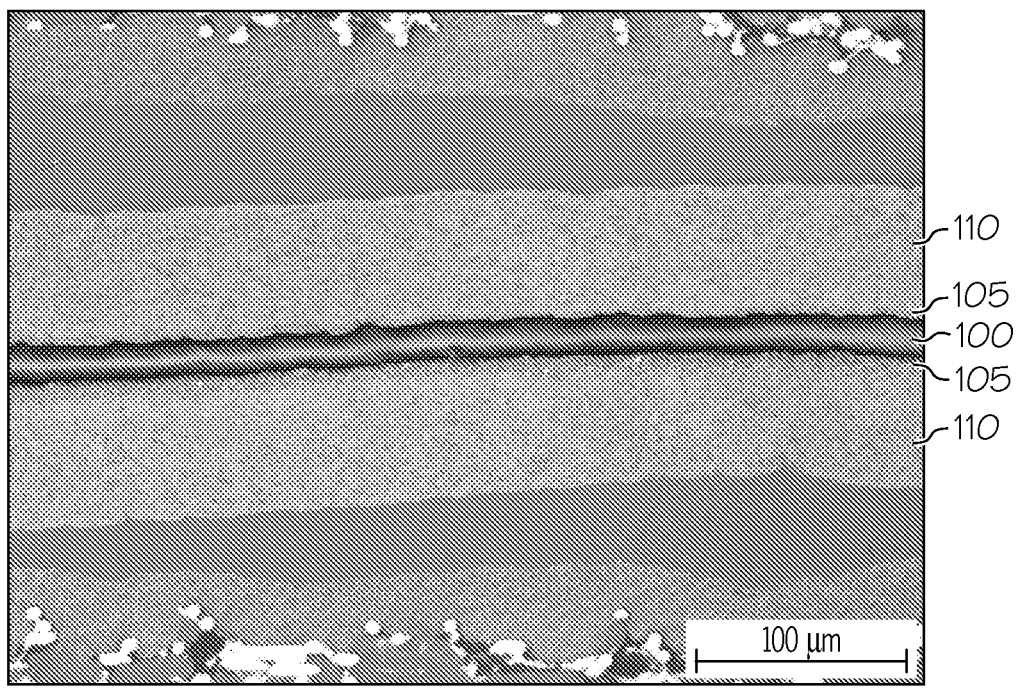
FIG. 3 shows an SEM image of a cross section of a MEA with a catalyst coated MPL as an external reinforcing layer, after fuel cell durability test by relative humidity (RH) cycling.

The crossover leak rates of the two fuel cells were plotted as a function of test cycles, as shown in FIG. 3. The MEA failure criterion is defined as having more than 10 sccm crossover leak. As shown in FIG. 3, the regular CCM MEA failed at about 12,000 test cycles, while the reinforced MEA with the catalyst coated MPL bonded to the PEM survived 20,000 test cycles.

Figure 2:
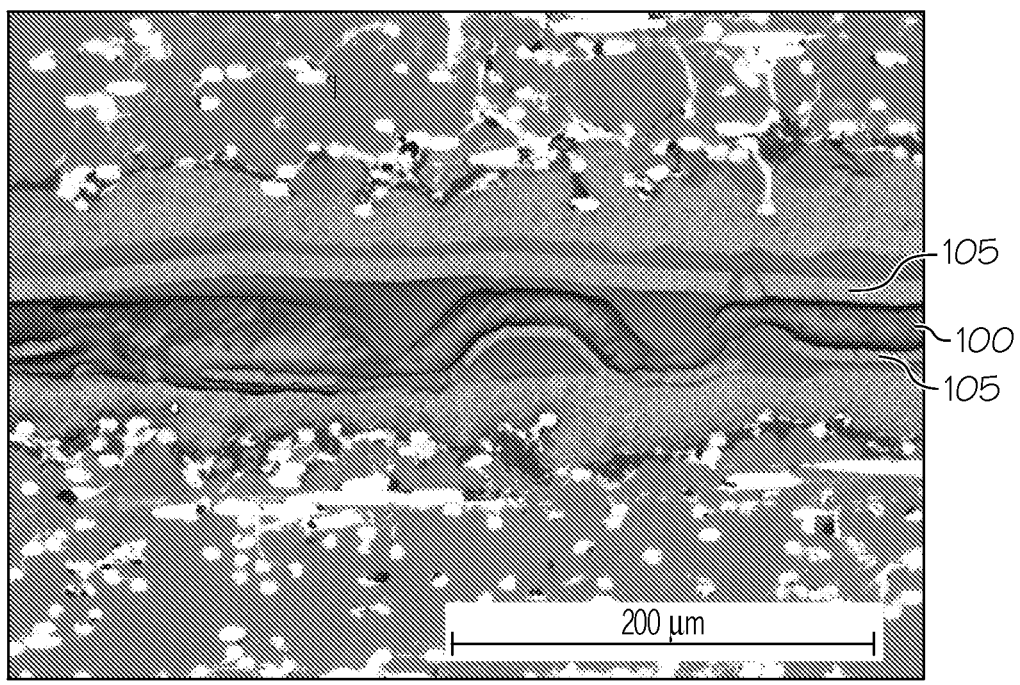
FIG. 2 shows an SEM image of a cross section of a MEA without external reinforcement, after fuel cell durability test by relative humidity (RH) cycling.

SEM images on the cross-section of the MEAs of Comparative Example 1 and Example 1 were taken after fuel cell durability tests. FIG. 2 shows a cross-section of an MEA without reinforcement. The membrane 100 has electrode layers 105 on both sides. The membrane has buckled. FIG. 3 shows a cross-section of an MEA with the catalyst coated f-MPL as the reinforcing layer for the PEM. The membrane 100 is surrounded on both sides with the f-MPL 110 with the electrode layer 105 thereon. The PEM in the MEA made according to the present method remains flat.

Figure 4:
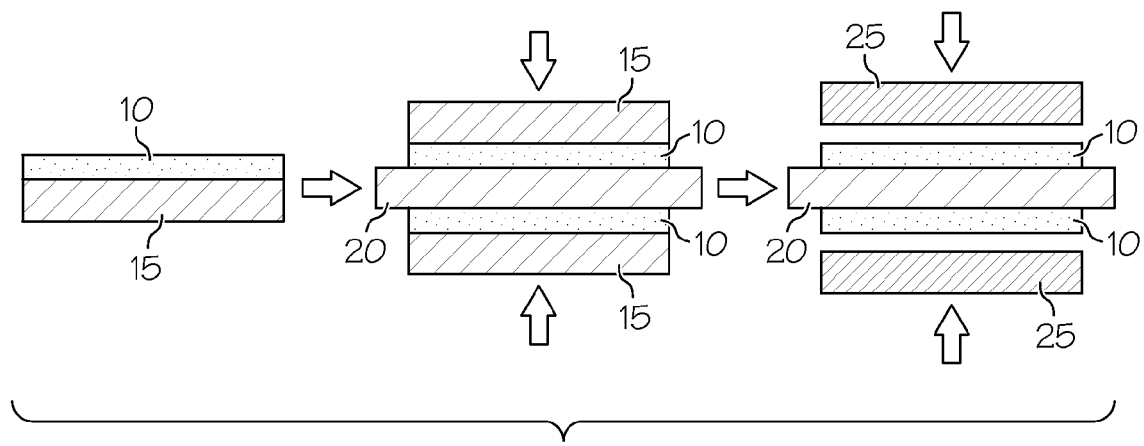
FIG. 4 illustrates a prior art process to prepare the MPL externally reinforced MEA.

The present method reduces buckling of the PEM and improves the fuel cell durability. It also simplifies the manufacturing process and reduces the cost for making improved MEAs. FIG. 4 shows a schematic of a prior art method of making an externally reinforced MEA. As indicated in FIG. 4, the catalyst material 10 is coated on a decal substrate 15 (e.g., ETFE). After drying, the catalyst layers 10 are transferred from the decal substrate 15 to the two surfaces of the PEM 20 to form a CCM through a hot press process. The decal substrates 15 are removed. Thereafter, another hot press process is applied to bond two free standing microporous layers (f-MPLs) 25 to the PEM 20 having the catalyst layers 10 on both sides.

Figure 5:
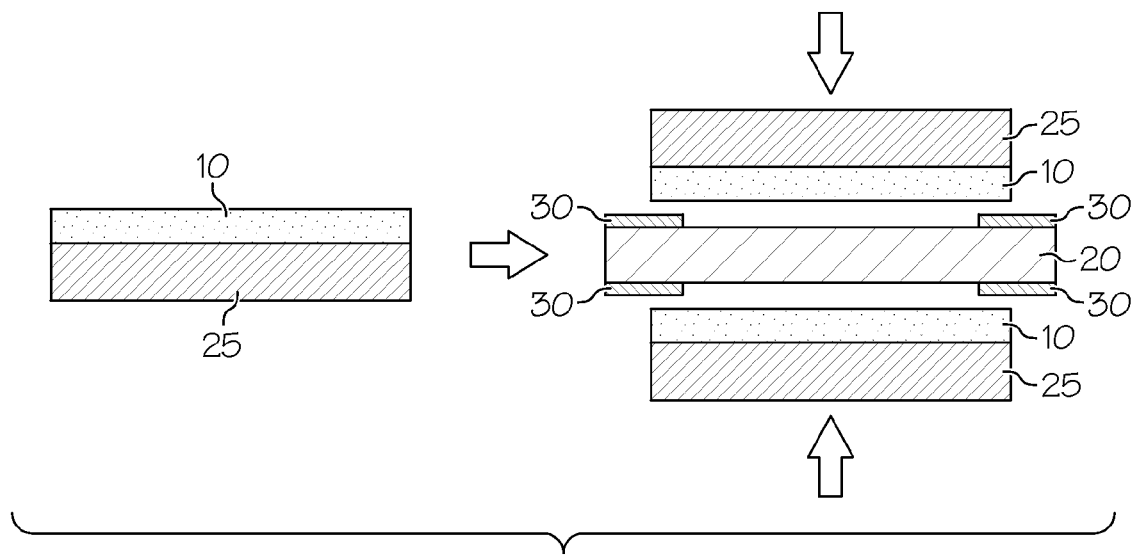
FIG. 5 illustrates one embodiment of a process to prepare the catalyst coated MPL externally reinforced MEA.

FIG. 5 shows the present technique to fabricate externally reinforced MEA. As shown in FIG. 5, the catalyst material 10 is directly coated on the free standing MPL 15 using a method described above. The subgasket 30 is placed on the PEM 20. The subgasket 30 can be placed on one or both sides of the PEM 20. The reinforced MEA can then be produced by sandwiching two pieces of catalyst coated MPL 10, 25 around the PEM 20 with the subgasket 30 on it in one hot press step. The process of the present technique is simpler than the prior art, reducing the fabrication cost. In addition, the present technique can reduce the potential damage to the MEAs induced by the second hot press process.

The above description of embodiments of the invention is merely exemplary in nature and, thus, variations thereof are not to be regarded as a departure from the spirit and scope of the invention.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a reinforced membrane electrode assembly comprising:
   placing a shim frame on a free standing microporous layer;
   applying a catalyst coating to the shim frame such that the catalyst coating covers the free standing microporous layer to form a catalyst coated free standing microporous layer;
   drying the catalyst coated free standing microporous layer;
   providing a polymer membrane; and
   bonding the catalyst coated free standing microporous layer on a surface of the polymer membrane.

2. The method of claim 1 wherein the catalyst coated free standing microporous layer is bonded using a hot press process.

3. The method of claim 1 further comprising inserting a subgasket material between the catalyst coated free standing microporous layer and the polymer membrane before bonding.

4. The method of claim 1 wherein a second catalyst coated free standing microporous layer is bonded on a second surface of the polymer membrane.

5. The method of claim 1 wherein the catalyst coating further comprises at least one of an ionomer, and carbon nanofiber.

6. The method of claim 1 wherein at least two layers of catalyst are coated on the free standing microporous layer.

7. The method of claim 1 wherein the layer of catalyst further comprises at least one of an ionomer, and carbon nanofiber.

8. The method of claim 1 wherein
   the applying comprises sliding a sliding bar or brush through the catalyst coating.

9. The method of claim 8 wherein the coating material is placed on the shim frame without the catalyst coating contacting the free standing microporous layer.

10. The method of claim 8 further comprising applying a vacuum to the free standing microporous layer.

* * * * *